United States Patent
Liu et al.

(10) Patent No.: US 12,464,217 B2
(45) Date of Patent: *Nov. 4, 2025

(54) METHOD, ELECTRONIC DEVICE, AND STORAGE MEDIUM FOR CAPTURING A SUBJECT BASED ON A POSTURE TEMPLATE AND CAPTURING PROMPT INFORMATION

(71) Applicant: Beijing Zitiao Network Technology Co., Ltd., Beijing (CN)

(72) Inventors: Wenli Liu, Beijing (CN); Shijia Zhao, Beijing (CN); Tang Tang, Beijing (CN); Yang Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,788

(22) Filed: Dec. 14, 2023

(65) Prior Publication Data

US 2024/0114230 A1 Apr. 4, 2024

Related U.S. Application Data

(63) Continuation of application No. PCT/CN2022/112920, filed on Aug. 17, 2022.

(30) Foreign Application Priority Data

Sep. 3, 2021 (CN) .......................... 202111032561.6

(51) Int. Cl.
*H04N 23/611* (2023.01)
*G06T 5/77* (2024.01)
*H04N 23/63* (2023.01)

(52) U.S. Cl.
CPC ............. *H04N 23/611* (2023.01); *G06T 5/77* (2024.01); *H04N 23/632* (2023.01)

(58) Field of Classification Search
CPC .... H04N 23/611; H04N 23/632; H04N 23/62; H04N 23/631; H04N 23/633; H04N 23/64; G06T 5/77
See application file for complete search history.

(56) References Cited

U.S. PATENT DOCUMENTS

2012/0262593 A1* 10/2012 Choi ....................... H04N 23/64
348/E5.042
2013/0258117 A1* 10/2013 Penov .................... G06V 10/24
348/207.1
(Continued)

FOREIGN PATENT DOCUMENTS

CN 108600632 A 9/2018
CN 109068055 A 12/2018
(Continued)

OTHER PUBLICATIONS

Dictionary.com definition of "proportion", retrieved from https://www.dictionary.com/browse/proportion on Jan. 23, 2025 (Year: 2025).*
(Continued)

*Primary Examiner* — Luong T Nguyen
(74) *Attorney, Agent, or Firm* — BakerHostetler

(57) ABSTRACT

Embodiments of this disclosure provide a method, electronic device, and storage medium for capturing. The method includes: in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and
(Continued)

response to a capturing instruction, controlling a camera to capture the subject.

18 Claims, 4 Drawing Sheets

(56) References Cited

U.S. PATENT DOCUMENTS

| | | | |
|---|---|---|---|
| 2015/0373258 A1* | 12/2015 | Chuang | G06V 10/7515 |
| | | | 348/333.04 |
| 2017/0374280 A1* | 12/2017 | Chan | H04N 1/00183 |
| 2018/0007259 A1* | 1/2018 | Wang | G06V 40/166 |
| 2018/0060690 A1* | 3/2018 | Lee | G06V 10/751 |
| 2018/0213145 A1 | 7/2018 | Guo et al. | |
| 2020/0084371 A1* | 3/2020 | Guo | H04N 23/63 |
| 2021/0297582 A1* | 9/2021 | Brown | G06N 3/08 |
| 2021/0335004 A1* | 10/2021 | Zohar | G06T 7/74 |
| 2022/0232162 A1* | 7/2022 | Gupta | G06F 16/538 |

FOREIGN PATENT DOCUMENTS

| | | |
|---|---|---|
| CN | 109104631 A | 12/2018 |
| CN | 109660719 A | 4/2019 |
| CN | 110475069 A | 11/2019 |
| CN | 111062276 A | 4/2020 |
| CN | 111343382 A | 6/2020 |
| CN | 112702521 A | 4/2021 |
| CN | 113132618 A | 7/2021 |
| CN | 114697539 A | 7/2022 |
| JP | 2007-259035 A | 10/2007 |
| JP | 2008066886 A | 3/2008 |
| JP | 2012244249 A | 12/2012 |
| JP | 2018197883 A | 12/2018 |
| KR | 10-2228663 B1 | 3/2021 |
| WO | WO 2014/178228 A1 | 11/2014 |
| WO | WO 2016/144800 A1 | 9/2016 |

OTHER PUBLICATIONS

European Patent Application No. 22863131.1; Extended Search Report; dated Sep. 23, 2024; 10 pages.
Japanese Patent Application No. 2023-577617; first Office Action dated Dec. 6, 2024; 10 pages with machine-generated translation.
International Patent Application No. PCT/CN2022/112920; Int'l Search Report; dated Nov. 21, 2022; 3 pages.
Chinese Patent Application No. 202111032561.6 Office Action dated Feb. 27, 2025, 17 pages with machine translation.
Japanese Patent Application No. 2023-577617 Office Action dated Apr. 22, 2025, 9 pages with machine translation.

* cited by examiner

METHOD, ELECTRONIC DEVICE, AND STORAGE MEDIUM FOR CAPTURING A SUBJECT BASED ON A POSTURE TEMPLATE AND CAPTURING PROMPT INFORMATION

The disclosure is a continuation of International Patent Application No. PCT/CN2022/112920, filed on Aug. 17, 2022, which claims the priority of Chinese Patent Application No. 202111032561.6, filed on Sep. 3, 2021, both of which are incorporated herein by reference in their entireties.

FIELD

Embodiments of the present disclosure relates to the capturing field, for example, to a method, apparatus, electronic device, and storage medium for capturing.

BACKGROUND

Currently, users can capture through terminal devices. However, due to the lack of capturing experience, it is common to encounter situations where the capturing effect of captured pictures is not ideal, causing users to spend a lot of energy to find a suitable method of capturing to re-capture or retouch the captured pictures, resulting in a poor capturing experience.

SUMMARY

The embodiments of the present disclosure provide a method, apparatus, electronic device and storage medium for capturing, to improve the capturing effect of pictures.

In a first aspect, the embodiments of the present disclosure provide a method of capturing, comprising:
  in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and
  in response to a capturing instruction, controlling a camera to capture the subject.

In a second aspect, the embodiments of the present disclosure further provide an apparatus for capturing, comprising:
  a template display module configured for in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and
  a capturing module configured for in response to a capturing instruction, controlling a camera to capture the subject.

In a third aspect, the embodiments of the present disclosure further provide an electronic device, comprising:
  a processor; and
  a memory for storing a program,
  the program, when executed by the processor, causing the processor to implement a method of capturing according to the embodiments of the present disclosure.

In a fourth aspect, the embodiments of the present disclosure further provide a computer readable storage medium having stored thereon a computer program, the computer program executable by a processor to implement a method of capturing according to the embodiments of the present disclosure.

BRIEF DESCRIPTION OF THE DRAWINGS

The above and other features, advantages, and aspects of the embodiments of the present disclosure will become more apparent in conjunction with the accompanying drawings and with reference to the following detailed description. Throughout the drawings, the same or similar reference numerals refer to the same or similar elements. It should be understood that the drawings are illustrative and that the components and elements are not necessarily drawn to scale.

DETAILED DESCRIPTION

Figure 1:
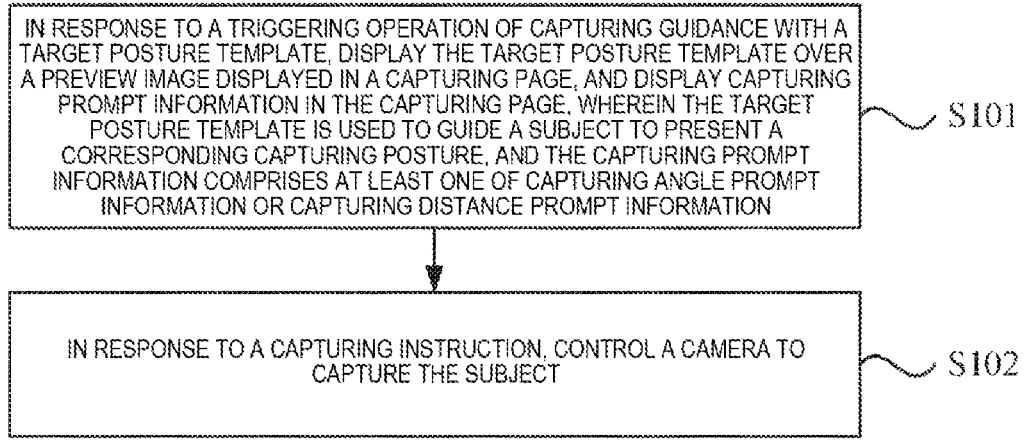
FIG. 1 is a schematic flowchart of a method of capturing provided by the embodiments of the present disclosure.

The embodiments of the present disclosure will be described in more detail below with reference to the accompanying drawings. Although certain embodiments of the present disclosure are shown in the drawing, it should be understood that the present disclosure may be implemented in various forms.

It should be understood that various steps described in method implementations of the present disclosure may be executed in different orders and/or in parallel. In addition, the method implementations may include additional steps and/or omit performance of illustrated steps.

As used herein, the term "include" and its variations are open-ended, i.e., "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that concepts such as "first" and "second" mentioned in this disclosure are only used to distinguish different devices, modules, or units.

It should be noted that the modifications of "one" and "plurality" mentioned in this disclosure are illustrative, and those skilled in the art should understand that unless the context clearly indicates otherwise, it should be understood as "one or more".

FIG. 1 is a schematic flowchart of a method of capturing provided by the embodiments of the present disclosure. The method may be performed by an apparatus for capturing, wherein the apparatus may be implemented by software and/or hardware, and may be configured in an electronic device, typically in a mobile phone or tablet. The method of capturing provided by the embodiments of the present disclosure is suitable for guiding at least one of the capturing postures, capturing angle, or capturing distance of the user. As shown in FIG. 1, the method of capturing provided by this embodiment may include:

S101, in response to a triggering operation of capturing guidance with a target posture template, display the target posture template over a preview image displayed in a capturing page, and display capturing prompt information in the capturing page, wherein the target posture template is used to guide a subject to present a corresponding capturing posture, and the capturing prompt information comprises at least one of capturing angle prompt information or capturing distance prompt information.

In this embodiment, the capturing guidance triggering operation may be a triggering operation that instructs the electronic device to perform capturing posture guidance through the target posture template, that is, a triggering operation that instructs the electronic device to display the target posture template, such as a operation of selecting or importing posture pictures. The target posture template may be a posture template that the user wants to use for capturing guidance, such as a template corresponding to a posture picture selected or imported by the user. The template may be a posture outline template, that is, a wireframe composed of the outline of a character. The target posture template may be used to guide the subject to present the corresponding capturing posture for capturing. The subject may be understood as an object captured by the electronic device, such as a person or animal captured by the electronic device. The following takes the subject as a person as an example.

The capturing prompt information may be understood as capturing prompt information generated periodically based on a current preview image (i.e., a preview image collected by the camera at the current time), and the information content of the current capturing prompt information may be set as needed. For example, the capturing prompt information may include at least one of: current key part proportion information, prompt information of a relative size between the current key part proportion information and the predetermined key part proportion information, and capturing correction information. That is, the current key part proportion information may be used as the capturing prompt information that needs to be displayed. Based on the relative size between the current key part proportion information and the predetermined key part proportion information, the capturing prompt information that needs to be displayed is generated; or based on deviation information between the current key part proportion information and the predetermined key part proportion information, the capturing correction information is determined, and the capturing correction information is used as the current capturing prompt information. Herein, the current key part proportion information may include head proportion information and/or leg proportion information of the subject in the current preview image; the prompt information of the relative size between the current key part proportion information and a predetermined key part proportion information may be information used to prompt the relative size, such as information for prompting that head proportion/leg proportion is too large or too small; the capturing correction information may be information for correcting a capturing defect by the user at the current time. For example, when a proportion of the subject's head in the current preview image is too large, or, when a proportion of the subject's legs in the current preview image is too small, the user may be prompted to increase the capturing distance (e.g., moving the camera backward), adjust a capturing angle downward (e.g., moving the camera downward), and so on.

Figure 2:
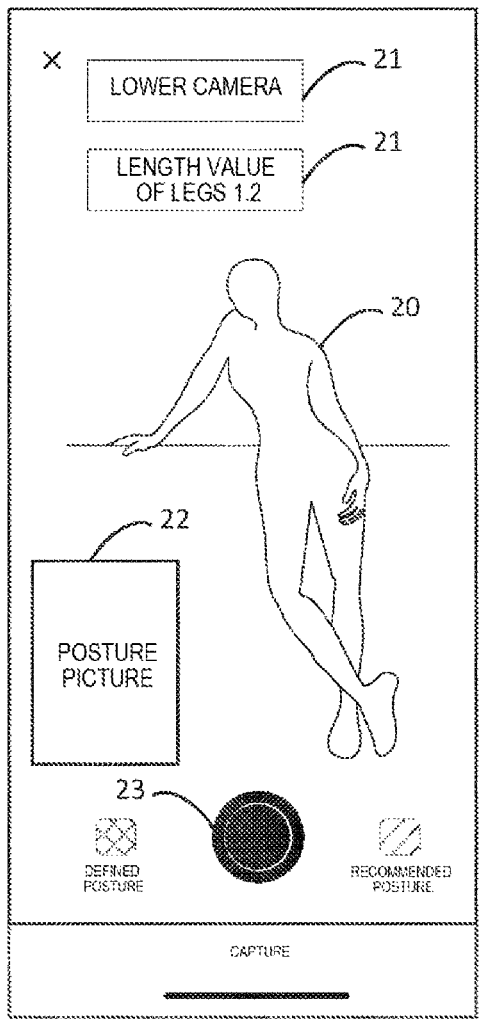
FIG. 2 is a schematic diagram of displaying a capturing page provided by the embodiments of the present disclosure.

In one embodiment, as shown in FIG. 2, when the user wants to use a posture template 20 for capturing guidance, a triggering operation using the posture template 20 for capturing guidance may be performed. Correspondingly, when the electronic device detects the triggering operation of the user, the posture template 20 may be displayed over a preview image displayed in the capturing page; and while displaying the posture template 20, the current capturing prompt information 21 is periodically generated (i.e., the capturing prompt information at the current time), and the current capturing information prompt 21 is displayed in the capturing page. For example, when the capturing prompt information is initially displayed (i.e., no capturing prompt information 21 has been displayed in the capturing page), the electronic device may generate the current capturing prompt information 21 according to the current preview image, and display the current capturing prompt information 21 in the capturing page; when the capturing prompt information has been displayed in the capturing page, the electronic device may generate the current capturing prompt information 21 according to the current preview image, and update the capturing prompt information displayed in the capturing page to the current capturing prompt information 21.

In the above embodiment, a display mode of the posture template in the capturing page may be set as needed, for example, the posture template may be displayed directly at a predetermined display position of the capturing page. Considering the composition effect of the captured picture/video frame, optionally, the posture template may be displayed according to a display position of the posture template in its corresponding posture picture. That is, the posture template may be displayed at the same display position as the original display position of the posture template in its corresponding posture picture.

In the above embodiment, the determination method of the current capturing prompt information may be flexibly set. Optionally, the capturing prompt information may be generated based on the key part proportion information, where the key part proportion information is key part proportion information of the subject in the preview image. For example, the current key part proportion information may be determined based on the current preview image collected by the camera, where the current key part proportion information is key part proportion information of the subject in the current preview image collected by the camera; the current capturing prompt information is generated based on the current part key proportion information.

In one embodiment, the current key part proportion information may be understood as key part proportion information of the capturer in the current preview image. The key part proportion information may be proportion information of key parts of the subject in the capturer's body, or proportion information between the key parts of the subject and a predetermined part of the subject. The proportion information between the key part proportion information of the subject and the predetermined part of the subject will be described as the key part proportion information as an example below. The key parts may include at least one of the head or legs; the proportion information may be length proportion information, such as proportion information parallel to the direction of the human body; the predetermined part may be the upper body of the subject (such as including or excluding the head).

In one embodiment, the electronic device, during the process of displaying the target posture template, periodically determines the current key part proportion information of the subject in the current preview image captured by the camera, and displays or updates capturing prompt information displayed in the capturing page according to the current key part proportion information.

By way of example, a model (such as a posture recognition model) capable of recognizing key point information of a subject may be pre-trained. Therefore, when displaying a capturing page, the current preview image collected by the camera may be periodically obtained, the current preview image may be input into the posture recognition model, and the key point information of the subject output by the posture recognition model in the current preview image may be obtained as the current posture information of the subject. The key parts and predetermined part of the subject are recognized based on the current posture information, length information of the key parts of the subject in the preview image and length information of the predetermined part in the preview image are determined, and length proportion information between the key parts and predetermined part of the subject are computed based on the length information as the current key part proportion information of the subject, and the current capturing prompt information is generatee based on the current key part proportion information. Here, the key points of the subject may be set as needed, for example, it may include the outline points of the subject in the current preview image, that is, the points constituting the character outline of the subject in the current preview image. It may also include the points constituting the key part (such as legs or head) of the subject in the current preview image.

The following is taken as an example: the key parts including the head and legs, the predetermined part being the subject's upper body (excluding the head), the subject standing upright. The length information of the head, legs and upper body of the subject in the vertical direction of the capturing image may be determined according to the key point information of the subject in the current preview image, and the head proportion information of the subject in the current preview image is computed according to the length information of the head and the length information of the upper body of the subject; and the leg proportion information of the subject in the current preview image is computed according to the length information of the legs and the length information of the upper body of the subject, thereby obtaining the current key part proportion information of the subject.

In addition, as shown in FIG. 2, when the posture template 20 is displayed in the capturing page, the posture picture 22 corresponding to the posture template 20 may also be displayed in the capturing page, that is, the posture picture 22 on which the posture template 20 is generated is displayed, so that the user may clearly identify the subject and capturing environment in the posture picture 22 corresponding to the capturing template 20.

In the present embodiment, the posture template and the capturing prompt information are display. The posture template is used to guide the subject in the capturing posture, and the capturing prompt information is used to provide the capturing prompt to guide the subject to present a better capturing posture, and make the subject have a suitable body proportion in the current preview image, thereby avoiding the case where the subject's posture is not good or the body proportions of the subject are uncoordinated (such as the head is too big or the legs are too short) in the captured videos or pictures, to improve the quality of the captured video or picture.

In one embodiment, when receiving the triggering operation of the capturing guidance with the target posture template, it is also possible to use flash to fill light when needed, so that the captured picture has a better light effect. At this time, optionally, the method of capturing provided by the present embodiment may further include: in response to the triggering operation of capturing guidance with the target posture template, controlling a flash to use a light corresponding to the capturing environment information of the subject to fill light.

By the way of example, when receiving the triggering operation of the capturing guidance with the target posture template, the target posture template and capturing prompt information are displayed in the capturing page, and the light information (for example, at least one of: direction information, brightness information, and color information of the light) is determined according to the capturing environment information of the subject or the light information in the posture picture corresponding to the target posture template, and the corresponding flash is controlled to fill light with the light corresponding to the light information. Herein, the flash may be a flash configured by the electronic device itself or a flash connected to the electronic device. The capturing environment information of the subject may include external light information of the subject, that is, light information of the capturing environment where the subject is located.

S102, in response to a capturing instruction, control a camera to capture the subject.

In one embodiment, upon receiving the capturing instruction, the electronic device may control the camera to capture the subject, for example, control the camera to take photos or videos.

In one embodiment, the capturing instruction may instruct the electronic device to capture, such as a photo capturing instruction or a video capturing instruction, which may be generated automatically by the electronic device when the current condition meets a predetermined generation condition, and may also be generated based on the received capturing operation (e.g., triggering operation performed on the capturing control). That is, the electronic device may automatically capture, and may also capture based on the user's triggering operation.

In one embodiment, before controlling the camera to capture in response to the received capturing instruction, further comprising at least one of: computing an image score of a current preview image based on at least one of matching degree information between current posture information of the subject and the target posture template or expression information of the subject, and generating the capturing instruction if the image score is greater than a predetermined threshold; and generating the capturing instruction if a capturing operation is performed on the capturing page.

In one embodiment, when displaying the target posture template, the electronic device may periodically compute the current posture information of the subject through the matching degree information between the target posture templates. Based on at least one of the matching degree information or the expression information (e.g., a smile degree of the subject and/or an opening degree of eyes, etc.) of the subject in the current preview image the current preview image is scored, to obtain an image score for the current preview image. In the case where the image score is greater than a predetermined threshold value, a capturing instruction is automatically generated; in the case where the image score is less than a predetermined threshold value, an operation of automatically generating a capturing instruction is not performed. Alternatively, when the user wants to capture, the capturing control may be triggered in the capturing page 23 (as shown in FIG. 2). Thereby, when detecting that the user triggers the capturing control 23, the electronic device may determine that a capturing operation for indicating the electronic device to capture is received, and in response to the capturing operation, a capturing instruction is generated.

The method of capturing provided in the present embodiment, in response to a triggering operation of capturing guidance with a target posture template, displays the target posture template over a preview image displayed in a capturing page, and displays capturing prompt information in the capturing page, wherein the target posture template is used to guide a subject to present a corresponding capturing posture, and the capturing prompt information comprises at least one of capturing angle prompt information or capturing distance prompt information; and in response to a capturing instruction, controls a camera to capture the subject. The present embodiment guides the capturing posture through the posture template, and prompts at least one of capturing angle or capturing distance through the capturing prompt information, which may solve the problem that the subject is not good at posing when capturing, and makes the subject have a suitable body proportion in the captured picture/video, improving the imaging effect of the subject and reducing the difficulty of capturing.

Figure 3:
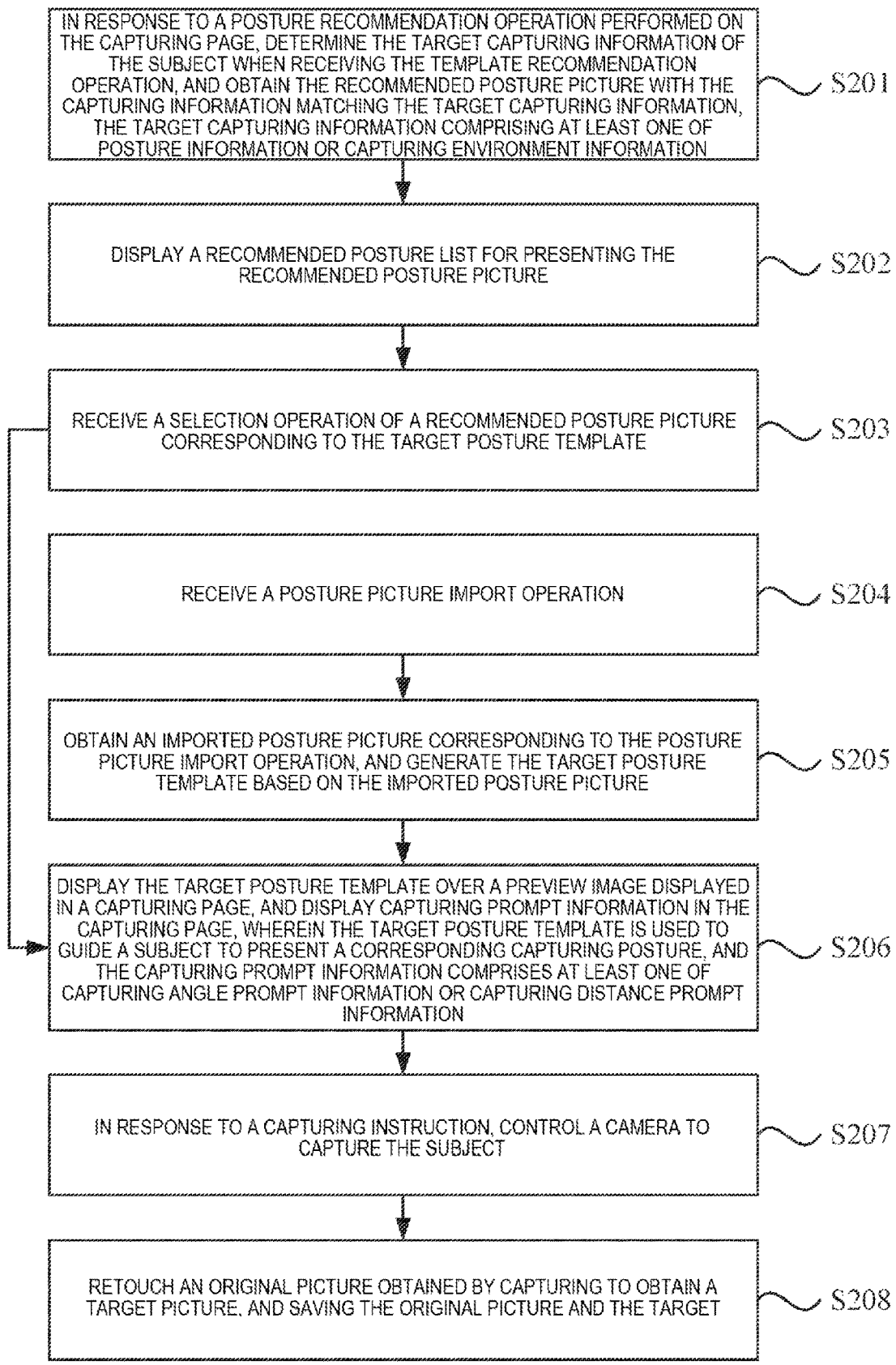
FIG. 3 is a schematic flowchart of another method of capturing provided by the embodiments of the present disclosure.

FIG. 3 is a schematic flowchart of another method of capturing provided by the embodiments of the present disclosure. The scheme in the present embodiment may be combined with one or more optional schemes in the above embodiments. Optionally, the triggering operation is a selection operation of a recommended posture picture corresponding to the target posture template. The method of capturing provided in the present embodiment further includes: in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

Optionally, before displaying the recommended posture list, further comprising: determining the target capturing information of the subject when receiving the template recommendation operation, and obtaining the recommended posture picture with the capturing information matching the target capturing information.

Optionally, the triggering operation is a posture picture import operation, and before displaying the target posture template over the preview image displayed in the capturing page, further comprising: obtaining an imported posture picture corresponding to the posture picture import operation, and generating the target posture template based on the imported posture picture.

Optionally, the capturing instruction is a capturing instruction, and after controlling the camera to capture, further comprising: retouching an original picture obtained by capturing to obtain a target picture, and saving the original picture and the target picture.

Corresponding, as shown in FIG. 3, the method of capturing provided in the present embodiment may include:

S201, in response to a posture recommendation operation performed on the capturing page, determine the target capturing information of the subject when receiving the template recommendation operation, and obtain the recommended posture picture with the capturing information matching the target capturing information, the target capturing information comprising at least one of posture information or capturing environment information.

Figure 4:
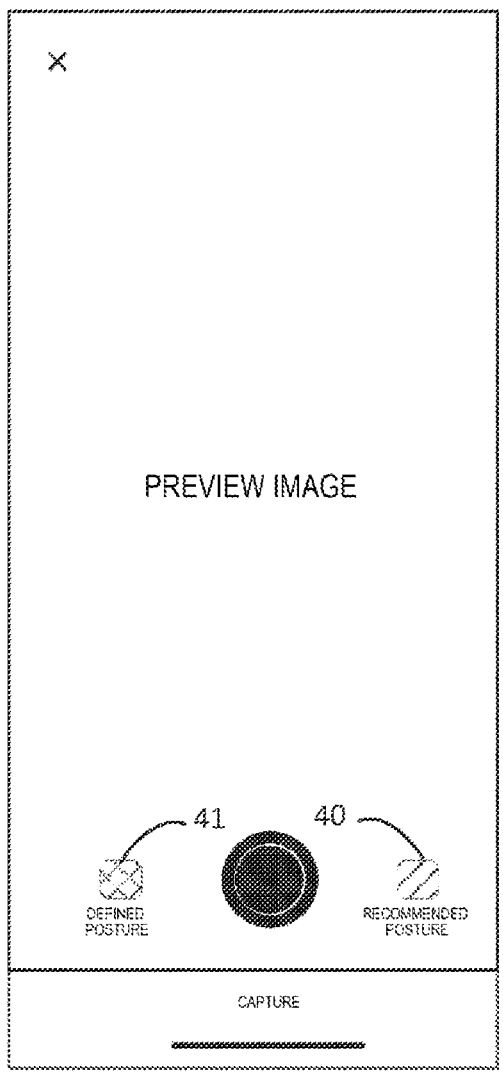
FIG. 4 is a schematic diagram of displaying another capturing page provided by the embodiments of the present disclosure.

In this embodiment, the posture recommendation operation may be an operation indicating the electronic device to display the recommended posture list, such as an operation of triggering the recommended posture control displayed in the capturing page. The target capturing information may be understood as the capturing information of the subject when receiving the posture recommendation operation, which may include at least one of the posture information or the capturing environment information. The posture information may be understood as information for characterizing the capturing posture of the subject, such as the position information of the key points of the subject. The capturing environment information may be understood as information for characterizing the capturing environment in which the subject is located, such as capturing background information, external light information, etc. In one embodiment, the electronic device displays the capturing page, as shown in FIG. 4. Therefore, when the capturer wants to instruct the electronic device to recommend capturing posture, he may display his own preferred posture (for the case where the capturer is the subject) or instruct the subject to do his own preferred posture (for the case where the capturer is not the subject), and trigger the recommended posture control 40 in the capturing page. correspondingly, when the electronic device detects that the user triggers the recommended posture control 40 in the capturing page, it may determine that the posture recommendation operation has been received, and in response to the posture recommendation operation, the target capturing information of the subject is determined based on the preview image collected by the camera at the current time. For example, the predetermined image is input into the pre-trained posture detection model, and the target capturing information of the subject is determined based on the posture detection model, and the recommended posture picture is obtained based on the target capturing information.

In the present embodiment, the electronic device may determine and obtain the recommended posture picture directly based on the target capturing information, for example, obtain capturing information of each posture picture in a posture picture library, calculate the matching degree between the capturing information of each posture picture and the target capturing information, select a certain number of the posture pictures in order of the matching degree from high to low as recommended posture pictures, or take a posture picture with a matching degree exceeding a predetermined matching degree threshold value as the recommended posture picture, and obtain the determined recommended posture picture.

In addition, the electronic device may also determine the recommended posture picture based on the target capturing information through the server. For example, the electronic device may generate a posture picture obtaining request carrying the target capturing information and send the posture picture obtaining request to the server to request the server to return the recommended posture picture with the capturing information matching the target capturing information. Therefore, after receiving the posture picture obtaining request sent by the electronic device, the server may parse the posture picture obtaining request to obtain the target capturing information carried in the posture picture obtaining request, compute the matching degree between the capturing information of each posture picture in the posture picture library and the target capturing information, select a certain number of posture pictures in order of the matching degree from high to low as recommended posture pictures, or take a posture picture with a matching degree exceeding a predetermined matching degree threshold value as the recommended posture picture, and send the determined recommended posture picture to the electronic device. Correspondingly, the electronic device may receive the recommended posture picture returned by the server.

In one embodiment, a posture picture in the posture picture library may be pre-set, i.e., a picture with better capturing effect may be obtained in advance as the posture picture, and the picture and its corresponding posture template may be stored in the posture picture library.

S202, display a recommended posture list, wherein the recommended posture list is used for displaying the recommended posture picture.

Figure 5:
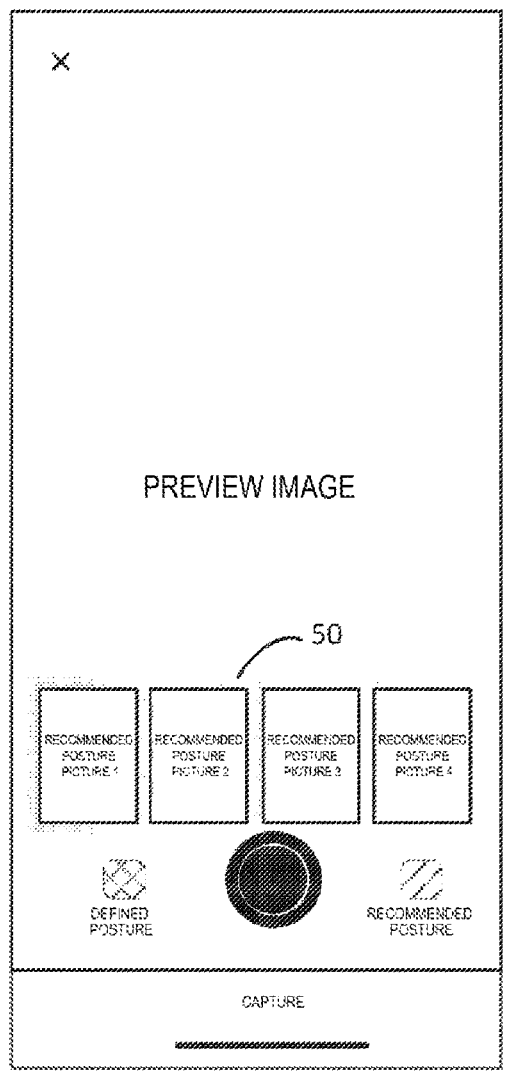
FIG. 5 is a schematic diagram of recommended posture list provided by the embodiments of the present disclosure.

In one embodiment, after obtaining the recommended posture picture, the electronic device may display the recommended posture list 50 in the capturing page, and displays the recommended posture picture obtained in the recommended posture list 50, as shown in FIG. 5, for the capturer or the subject to select.

In the present embodiment, the posture picture may be recommended to the user according to the capturing information of the subject at the current time, and a posture guidance can be provided to the user through the posture template corresponding to the posture picture. Therefore, the subject may freely make a posture he likes in the current capturing environment, and may recommend similar high-quality posture for the user according to the capturing environment and the posture that the subject likes. By making fine adjustments to the subject's preferred posture, better capturing effect can be achieved without the need for the subject to manually select his preferred posture from a large number of posture pictures. This can solve the problem of the subject not taking a posture during the capturing process, improve the capturing effect of the picture/video, and reduce the time and difficulty of posture template selection.

In one embodiment, in the case that the user does not select any recommended posture picture, i.e., the case where the recommended posture list is closed, the capturing prompt information may be displayed only in the capturing page, to prompt the user by the capturing prompt information. At this time, after the display recommended posture list, further comprising: in response to a list closing operation while the target posture picture is not selected, ceasing a display of the recommended posture list, and displaying the capturing prompt information in the capturing page.

In the above embodiment, when no recommended posture picture is displayed in the recommended posture list, that is, when no recommended posture picture with the capturing information matching the target capturing information is obtained; or, when the user does not want any recommended posture picture displayed in the recommended posture list, for example, when the user is dissatisfied with the capturing posture in each recommended posture picture displayed in the recommended posture list, an operation (i.e., a list closing operation) of closing the recommended posture list may be performed. Correspondingly, when detecting the user's list closing operation, the electronic device may stop displaying the recommended posture list in the capturing page and display the capturing prompt information in the capturing page.

S203, receive a selection operation of a recommended posture picture corresponding to the target posture template, and perform S206.

In the present embodiment, the selection operation may be an operation of selecting any recommended posture picture displayed in the recommended posture list, such as an operation of clicking on the recommended posture picture.

In one embodiment, as shown in FIG. 5, the electronic device displays the recommended posture list 50, and displays each recommended posture picture in the recommended posture list 50. Therefore, when the user wants to use a capturing posture in a recommended posture picture for capturing, the recommended posture picture may be triggered. Correspondingly, when detecting that the user triggers a recommended posture picture, the electronic device may take the posture template corresponding to the recommended posture picture as the target posture template, and determine that the selection operation of the posture picture corresponding to the target posture template is received, that is, determine that the triggering operation using the target posture template for capturing guidance is received.

In the present embodiment, the target posture template may be sent by the server to the electronic device or generated by the electronic device according to the corresponding recommended posture picture. That is, when the server sends each recommended posture picture to the electronic device, a posture template corresponding to each recommended posture picture may be sent simultaneously to the electronic device. Alternatively, the server may only send each recommended posture picture to the electronic device. Therefore, when detecting that the user triggers one recommended posture picture in the recommended posture list, the electronic device may generate its corresponding target posture template according to the recommended posture picture.

Further, when receiving the selection operation on the posture picture corresponding to the target posture template, in addition to performing S208, the electronic device may also close the recommended posture list, so that the user may view the preview image and the target posture template.

S204, receive a posture picture import operation.

S205, obtain an imported posture picture corresponding to the posture picture import operation, and generate the target posture template based on the imported posture picture.

In this embodiment, the posture picture import operation may be an operation of importing posture picture, such as triggering the posture picture import control in the capturing page and selecting one picture for importing. The imported posture picture may be understood as the import posture picture.

In the present embodiment, the electronic device may employ a posture template corresponding to the posture picture imported by the user to guide the user for capturing.

In one embodiment, as shown in FIG. 4, the electronic device displays the capturing page. Therefore, when the user wants to use the capturing posture in the posture picture he likes to capture, he may trigger the posture picture import control 41 in the capturing page and select the posture picture he likes to import. Correspondingly, the electronic device may obtain the posture picture imported by the user and generate the posture template corresponding to the posture picture according to the posture picture. For example, the imported posture picture may be input into a pre-trained posture detection model, obtain key point information of one or more objects captured in the imported posture picture output by the posture detection model, and generate a posture template corresponding to the posture picture according to the key point information. For example, the key points on the outline of the corresponding object in the picture are connected in the clockwise or counterclockwise direction, and a wireframe diagram of the object is obtained as the posture template corresponding to the imported posture picture.

In addition, when the posture template corresponding to the imported posture picture is obtained, the imported posture picture and the posture template may also be uploaded to the server for storage, such as in the custom space corresponding to the user in the posture picture library, so that the user may subsequently use the posture template again to guide his capturing posture, or based on the posture picture stored in the posture picture library that can be used by all users and the imported posture picture stored in the user's custom space, the posture picture is recommended for the user.

s206, display the target posture template over a preview image displayed in a capturing page, and display capturing prompt information in the capturing page, wherein the target posture template is used to guide a subject to present a corresponding capturing posture, and the capturing prompt information comprises at least one of capturing angle prompt information or capturing distance prompt information.

S207, in response to a capturing instruction, control a camera to capture the subject.

s208, retouch an original picture obtained by capturing to obtain a target picture, and save the original picture and the target picture.

In the present embodiment, the original picture may be a picture obtained by capturing; the target picture may be a picture obtained by retouching the original picture.

In the present embodiment, when the capturing instruction is a capturing instruction, after the capturing is completed, the original picture obtained by capturing may also be retouched to improve the user experience.

Exemplary, after capturing to obtain the original picture, the electronic device may input the original picture into a pre-trained retouching model, retouch the original picture through the retouching model to obtain the target picture, while saving the original picture and the target picture obtained from the capturing, and may display the original picture or the target picture, or display the original picture and the target picture correspondingly. The retouching model may be used to retouch the input image (such as the original picture) and output the retouched target picture, which may be pre-trained.

To improve the retouching effect of the original picture, when the posture template is used to guide the capturing posture of the subject when taking the original picture, this embodiment may also retouch the original picture according to the posture picture corresponding to the posture template used when taking the original picture, so that the retouched target picture has the same or similar capturing effect as the posture picture, so that the retouched original picture is more in line with the user's (such as the capturer and/or subject) real capturing intention. At this time, optionally, retouching the original picture obtained by capturing to obtain the target picture, including: retouching the original picture based on the picture information of the target posture picture corresponding to the target posture template to obtain the target picture, wherein the picture information includes color information and/or image information of the target object in the target posture picture, and the image information includes size information and/or position information.

In this embodiment, the target posture template may be a posture template used when taking the original picture. The target posture picture may be a posture picture corresponding to the target posture template. The target object may be understood as an object corresponding to the target posture template in the target posture picture, such as a character and/or animal corresponding to the target posture template. The color information of the target posture picture may be color information of the target posture picture, such as filter information used in the target posture picture. The image information of the target object may include size information and/or position information of the target object presented in the target posture picture.

Exemplary, after obtaining the original picture by capturing, the electronic device may also input the original picture and the target posture picture corresponding to the target posture template used when taking the original picture into another retouching model. The retouching model retouches the original picture based on the color information of the target posture picture, the size information of the target object in the target posture picture, and/or the position information of the target object in the target posture picture. For example, the original picture may be added with the same filter as the target posture picture, and the original picture may be cropped and/or scaled based on the size information and/or position information of the target object in the target posture picture, so that the retouched target picture has a color and/or composition similar to the target posture picture.

The method of capturing provided by this embodiment recommends a posture picture according to the posture of the subject, guides the capturing posture of the user through the posture template corresponding to the posture picture selected or imported by the user, and automatically retouches the original picture after capturing the original picture. It may not only solve the problem that the subject does not pose when capturing, reduce the difficulty of capturing for the user, but also simplify the operation required to select the posture template, improve the capturing effect of the final picture, thereby improving the user's capturing experience.

Figure 6:
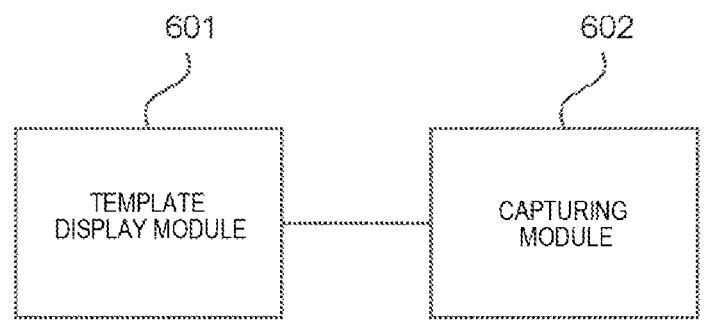
FIG. 6 is a schematic structural block diagram of an apparatus for capturing provided by the embodiments of the present disclosure.

FIG. 6 is a schematic structural block diagram of an apparatus for capturing provided by the embodiments of the present disclosure. The apparatus may be implemented by software and/or hardware. It may be configured in an electronic device, typically in a mobile phone or tablet computer, and may guide the user's capturing posture, capturing angle, and/or capturing distance by performing the method of capturing. As shown in FIG. 6, the apparatus for capturing provided in the present embodiment may include: a template display module 601 and a capturing module 602, wherein, The template display module 601 configured for in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information;

the capturing module 602 configured for in response to a capturing instruction, controlling a camera to capture the subject.

The apparatus for capturing provided in the present embodiment, by the template display module, in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; by the capturing module, in response to a capturing instruction, controlling a camera to capture the subject. This embodiment guides the capturing posture through the posture template, and prompts at least one of capturing angle or capturing distance through the capturing prompt information, which may solve the problem that the subject is not good at posing when capturing, and makes the subject have a suitable body proportion in the captured picture/video, improving the imaging effect of the subject and reducing the difficulty of capturing.

In the above embodiment, the triggering operation may be a selection operation on the recommended posture picture corresponding to the target posture template. The apparatus for capturing provided by the present embodiment may further comprise: a list display module configured to in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

In the above embodiment, the list display module may further be configured to: before displaying the recommended posture list, determining the target capturing information of the subject when receiving the template recommendation operation, and obtaining the recommended posture picture with the capturing information matching the target capturing information.

Alternatively, the apparatus for capturing provided in the present embodiment may further comprise: a list closing module configured to, after displaying the recommended posture list, in response to a list closing operation while the target posture picture is not selected, ceasing a display of the recommended posture list, and displaying the capturing prompt information in the capturing page.

In the above embodiment, the triggering operation is a posture picture import operation, the template display module 601 may further be configured to: before displaying the target posture template over the preview image displayed in the capturing page, obtaining an imported posture picture corresponding to the posture picture import operation, and generating the target posture template based on the imported posture picture.

In the above embodiment, the capturing prompt information is generated based on key part proportion information, and the key part proportion information is information on proportion of key parts of the subject in the preview image.

Alternatively, the apparatus for capturing provided in the present embodiment may further comprise: a filling light module configured to in response to the triggering operation of capturing guidance with the target posture template, controlling a flash to use a light corresponding to the capturing environment information of the subject to fill light.

Alternatively, the apparatus for capturing provided in the present embodiment may further comprise: an instruction generation module configured to include at least one of the following: before controlling the camera to capture in response to the received capturing instruction, computing an image score of a current preview image based on at least one of matching degree information between current posture information of the subject and the target posture template or expression information of the subject, and generating the capturing instruction if the image score is greater than a predetermined threshold; generating the capturing instruction if a capturing operation is performed on the capturing page.

Alternatively, the capturing instruction is a capturing instruction, the apparatus for capturing provided in the present embodiment may further comprise: a retouching module configured to, after controlling the camera to capture, retouching an original picture obtained by capturing to obtain a target picture, and saving the original picture and the target picture.

The apparatus for capturing provided in the embodiments of the present disclosure may perform method of capturing provided in any embodiment of the present disclosure, having corresponding functional modules and beneficial effects for performing the method of capturing. Technical details not described in detail in the present embodiment, the method of capturing provided in any embodiment of the present disclosure may be referred to.

Figure 7:
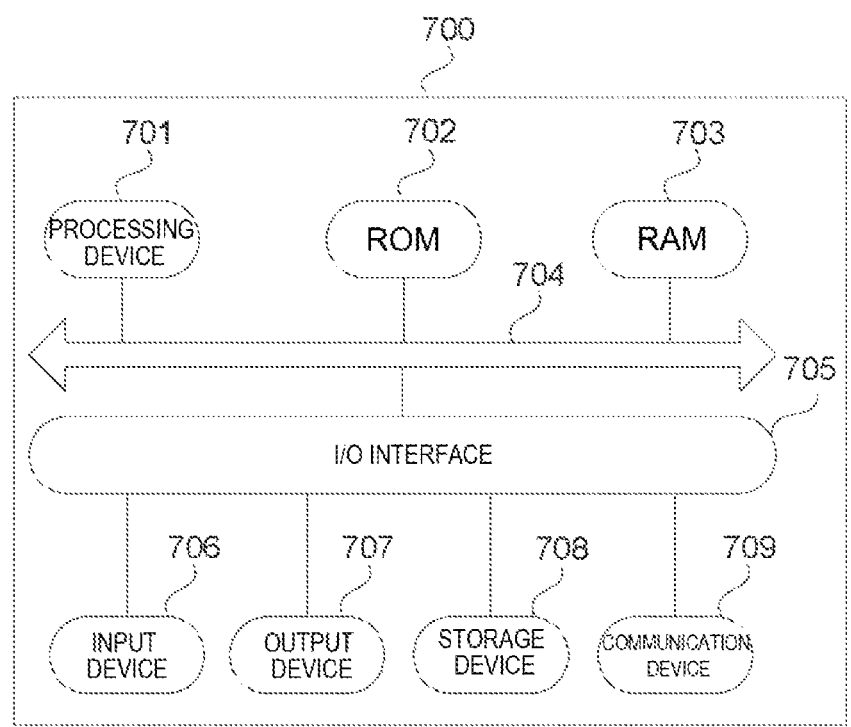
FIG. 7 is a schematic structural diagram of an electronic device provided by the embodiments of the present disclosure.

Referring now to FIG. 7, which is a schematic structural diagram of an electronic device 700 suitable for implementing the embodiments of the present disclosure. The electronic device in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 7 is merely an example.

As shown in FIG. 7, the electronic device 700 may include a processing device (such as a central processing unit and a graphics processor) 701, which may execute various appropriate actions and processing according to a program stored in a read-only memory (ROM) 702 or a program loaded to a random access memory (RAM) 703 from a storage device 708. Various programs and data required during operation of the electronic device 700 are also stored in the RAM 703. The processing device 701, the ROM 702 and the RAM 703 are connected with one another via a bus 704. An input/output (I/O) interface 705 is also connected to the bus 704.

Generally, the following apparatuses may be connected to the I/O interface 705: an input device 706 including for example a touch screen, a touch pad, a keyboard, a mouse, a camera, a microphone, an accelerometer and a gyroscope; an output device 707 including for example a liquid crystal display (LCD), a speaker and a vibrator; a storage device 708 including for example a magnetic tape and a hard disk; and a communication device 709. The communication device 709 may allow wireless or wired communication between the electronic device 700 and other devices for data exchange. Although FIG. 7 shows the electronic device 700 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 709, or installed from the storage device 708, or installed from the ROM 702. The computer program, when executed by the processing unit 701, causes the processing unit to execute the above functions defined in the methods according to the embodiments of the present disclosure.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, a client and server may communicate using any currently known or future developed network protocol such as HTTP (HyperText Transfer Protocol), and may interconnect with any form or medium of digital data communication (such as communication networks). Examples of communication networks include Local Area Networks (LANs), Wide Area Networks (WANs), the Internet (such as the Internet), and end-to-end networks (such as ad hoc end-to-end networks), as well as any network currently known or future developed.

The computer-readable medium may be included in the electronic device described above; or it may stand alone without being assembled into the electronic device.

The above computer-readable medium carrying one or more programs, when the one or more programs are executed by the electronic device, causing the electronic device: in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and in response to a capturing instruction, controlling a camera to capture the subject.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method, and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware.

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, an example 1 provides a method of capturing comprising:

in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and in response to a capturing instruction, controlling a camera to capture the subject.

According to one or more embodiments of the present disclosure, an example 2 according to the method of the example 1, the triggering operation is a selection operation of a recommended posture picture corresponding to the target posture template, and further comprises:

in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

According to one or more embodiments of the present disclosure, an example 3 according to the method of the example 2, before displaying the recommended posture list, further comprising:

determining the target capturing information of the subject when receiving the template recommendation operation, and obtaining the recommended posture picture with the capturing information matching the target capturing information.

According to one or more embodiments of the present disclosure, an example 4 according to the method of the example 2, after displaying the recommended posture list, further comprising:

in response to a list closing operation while the target posture picture is not selected, ceasing a display of the recommended posture list, and displaying the capturing prompt information in the capturing page.

According to one or more embodiments of the present disclosure, an example 5 according to the method of the example 1, the triggering operation is a posture picture import operation, and before displaying the target posture template over the preview image displayed in the capturing page, further comprising:

obtaining an imported posture picture corresponding to the posture picture import operation, and generating the target posture template based on the imported posture picture.

According to one or more embodiments of the present disclosure, an example 6 according to the method of any of the examples 1 to 5, the capturing prompt information is generated based on key part proportion information, and the key part proportion information is information on proportion of key parts of the subject in the preview image.

According to one or more embodiments of the present disclosure, an example 7 according to the method of any of the examples 1 to 5, further comprising:

in response to the triggering operation of capturing guidance with the target posture template, controlling a flash to use a light corresponding to the capturing environment information of the subject to fill light.

According to one or more embodiments of the present disclosure, an example 8 according to the method of any of the examples 1 to 5, before controlling the camera to capture in response to the received capturing instruction, further comprising at least one of:

computing an image score of a current preview image based on at least one of matching degree information between current posture information of the subject and the target posture template or expression information of the subject, and generating the capturing instruction if the image score is greater than a predetermined threshold; and generating the capturing instruction if a capturing operation is performed on the capturing page.

According to one or more embodiments of the present disclosure, an example 9 according to the method of any of the examples 1-5, the capturing instruction is a capturing instruction, and after controlling the camera to capture, further comprising:

retouching an original picture obtained by capturing to obtain a target picture, and saving the original picture and the target picture.

According to one or more embodiments of the present disclosure, an example 10 provides an apparatus for capturing comprising:

a template display module configured for in response to a triggering operation of capturing guidance with a target posture template, displaying the target posture template over a preview image displayed in a capturing page, and displaying capturing prompt information in the capturing page, wherein the target posture template is used to guide a subject to present a corresponding capturing posture, and the capturing prompt information comprises at least one of capturing angle prompt information or capturing distance prompt information; and a capturing module configured for in response to a capturing instruction, controlling a camera to capture the subject.

According to one or more embodiments of the present disclosure, an example 11 provides an electronic device comprising:

a processor; and a memory for storing a program, the program, when executed by the processor, causing the processor to implement a method of capturing according to any of the examples 1 to 9.

According to one or more embodiments of the present disclosure, an example 12 provides a computer readable storage medium having stored thereon a computer program, the computer program executable by a processor to implement a method of capturing according to any of the examples 1 to 9.

We claim:

1. A method of capturing, comprising:
in response to a triggering operation of capturing guidance with a posture template, displaying the posture template over a preview image displayed in a capturing page, and displaying capturing prompt information in the capturing page, wherein the posture template is configured to guide a subject to present a corresponding capturing posture, wherein the capturing prompt information comprises at least one of capturing angle prompt information or capturing distance prompt information, wherein the capturing prompt information comprises capturing correction information, wherein the capturing correction information is generated based on information indicating a proportion of key parts of the subject in the preview image, and wherein the capturing correction information comprises information configured to guide the subject to correct the proportion of the key parts of the subject in the preview image; and
in response to a capturing instruction, capturing the subject.

2. The method of claim 1, wherein the triggering operation is a selection operation of a recommended posture picture corresponding to the posture template, and the method further comprises:
in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

3. The method of claim 2, before displaying the recommended posture list, the method further comprising:
determining the target capturing information of the subject when receiving the template recommendation operation, and obtaining the recommended posture picture with the capturing information matching the target capturing information.

4. The method of claim 2, after displaying the recommended posture list, the method further comprising:
in response to a list closing operation while the target posture picture is not selected, ceasing a display of the recommended posture list, and displaying the capturing prompt information in the capturing page.

5. The method of claim 1, wherein the triggering operation is a posture picture import operation, and before displaying the posture template over the preview image displayed in the capturing page, the method further comprising:
obtaining an imported posture picture corresponding to the posture picture import operation, and generating the posture template based on the imported posture picture.

6. The method of claim 1, further comprising:
in response to the triggering operation of capturing guidance with the posture template, controlling a flash to use a light corresponding to a capturing environment information of the subject to fill light.

7. The method of claim 1, before controlling the camera to capture in response to a capturing instruction, the method further comprising at least one of:
computing an image score of a current preview image based on at least one of matching degree information between current posture information of the subject and the posture template or expression information of the subject, and generating the capturing instruction if the image score is greater than a predetermined threshold; and
generating the capturing instruction if a capturing operation is performed on the capturing page.

8. The method of claim 1, wherein after controlling the camera to capture the subject, the method further comprising:
obtaining an original picture by capturing the subject;
retouching the original picture to obtain a target picture; and
saving the original picture and the target picture.

9. An electronic device, comprising:
a processor; and a memory for storing a program, the program, when executed by the processor, causing the processor to implement acts comprising:
in response to a triggering operation of capturing guidance with a posture template, displaying the posture template over a preview image displayed in a capturing page, and displaying capturing prompt information in the capturing page, wherein the posture template is configured to guide a subject to present a corresponding capturing posture, wherein the capturing prompt information comprises at least one of capturing angle prompt information or capturing distance prompt information, wherein the capturing prompt information comprises capturing correction information, wherein the capturing correction information is generated based on information indicating a proportion of key parts of the subject in the preview image, and wherein the capturing correction information comprises information configured to guide the subject to correct the proportion of the key parts of the subject in the preview image; and
in response to a capturing instruction, capturing the subject.

10. The device of claim 9, wherein the triggering operation is a selection operation of a recommended posture picture corresponding to the posture template, and the acts further comprises:
in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

11. The device of claim 10, before displaying the recommended posture list, the acts further comprising:
determining the target capturing information of the subject when receiving the template recommendation operation, and obtaining the recommended posture picture with the capturing information matching the target capturing information.

12. The device of claim 10, after displaying the recommended posture list, the acts further comprising:

in response to a list closing operation while the target posture picture is not selected, ceasing a display of the recommended posture list, and displaying the capturing prompt information in the capturing page.

13. The device of claim 9, wherein the triggering operation is a posture picture import operation, and before displaying the posture template over the preview image displayed in the capturing page, the acts further comprising:

obtaining an imported posture picture corresponding to the posture picture import operation, and generating the posture template based on the imported posture picture.

14. The device of claim 9, the acts further comprising:

in response to the triggering operation of capturing guidance with the posture template, controlling a flash to use a light corresponding to a capturing environment information of the subject to fill light.

15. The device of claim 9, before controlling the camera to capture in response to a capturing instruction, the acts further comprising at least one of:

computing an image score of a current preview image based on at least one of matching degree information between current posture information of the subject and the posture template or expression information of the subject, and generating the capturing instruction if the image score is greater than a predetermined threshold; and generating the capturing instruction if a capturing operation is performed on the capturing page.

16. The device of claim 9, wherein after controlling the camera to capture the subject, the acts further comprising:

obtaining an original picture by capturing the subject;
retouching the original picture to obtain a target picture; and
saving the original picture and the target picture.

17. A non-transitory computer readable storage medium having stored thereon a computer program, the computer program executable by a processor to implement acts comprising:

in response to a triggering operation of capturing guidance with a posture template, displaying the posture template over a preview image displayed in a capturing page, and displaying capturing prompt information in the capturing page, wherein the posture template is configured to guide a subject to present a corresponding capturing posture, wherein the capturing prompt information comprises at least one of capturing angle prompt information or capturing distance prompt information, wherein the capturing prompt information comprises capturing correction information, wherein the capturing correction information is generated based on information indicating a proportion of key parts of the subject in the preview image, and wherein the capturing correction information comprises information configured to guide the subject to correct the proportion of the key parts of the subject in the preview image; and in response to a capturing instruction, capturing the subject.

18. The medium of claim 17, wherein the triggering operation is a selection operation of a recommended posture picture corresponding to the posture template, and the acts further comprises:

in response to a posture recommendation operation performed on the capturing page, displaying a recommended posture list for presenting the recommended posture picture, capturing information of the recommended posture picture matching target capturing information of the subject when receiving the template recommendation operation, the target capturing information comprising at least one of posture information or capturing environment information.

* * * * *